3,799,757
ARYLGLYOXYLONITRILEOXIMES AS PLANT REGULANTS
William D. Dixon, Kirkwood, and Maureen E. Becker, Clayton, Mo., assignors to Monsanto Company, St. Louis, Mo.
No Drawing. Filed Nov. 24, 1971, Ser. No. 201,984
Int. Cl. A01n 9/20
U.S. Cl. 71—76
15 Claims

ABSTRACT OF THE DISCLOSURE 2-arylglyoxylonitrile, 2-oximes are useful as plant regulants to modify the normal sequential development of treated plants to agricultural maturity.

---

This invention relates to a method of regulating plants by the application of a chemical thereto. More particularly, this invention is concerned with a method wherein a chemical is employed to modify the normal sequential development of treated plants to agricultural maturity.

The chemical compounds used in the practice of the invention may be represented by the formula

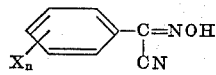

wherein $n$ is either zero or one, and X is chlorine, bromine or $NO_2$. Such compounds are identified as 2-arylglyoxylonitrile, 2-oximes. These compounds can be prepared directly from the corresponding arylacetonitriles by the action of alkyl nitrites and sodium ethoxide (Organic Reactions, vol. 7, pp. 343, 373, John Wiley & Sons, Inc., 1953).

The term "plant regulant," as employed in this application, connotes a material which serves to modify the normal sequential development of a treated plant to agricultural maturity. Such modification may result from the effect of the material on the physiological processes of the plant or from the effect of said material on the morphology of the plant. It should additionally be recognized that modifications may also result from a combination or sequence of both physiological and morphological factors.

Modifying effects of a plant regulant are probably most readily observed as changes in the size, shape, color or texture of the treated plant or any of its parts. Similarly, changes in the quantity of the plant fruit or flowers are also quite apparent from simple, visual inspection. The above changes may be characterized as an acceleration or retardation of vegetative growth, stunting, dwarfing, leaf or canopy alteration, increased brancing, tillering, chlorosis, albinism, terminal inhibition, increased flowering or fruit set and the like.

Modifications in the normal sequential development of a treated plant to agricultural maturity can also be manifested by increased root growth, stool or sprout inhibition, delayed budding, increased carbohydrate deposition or protein content defoliation, dessication, reduced transpiration, delayed senescence, prolonged dormancy, increased cold hardiness, delayed or accelerated ripening, thinning of fruit, prevention of pre-harvest fruit drop, loosening of fruit, etc.

Although many of the above modifications are per se desirable, it is most often the ultimate effect of such modifications on the economic factor that is of primary significance. For example, reducing the physical size of each plant in a field permits the growing of more plants per unit area and leads to increased yields. Or, loosening of fruit at the proper time permits simplified, mechanized harvesting or the expenditure of less time for manual picking. Further, a reduction in the maturation rate on portions of a crop permits an extended harvest period at peak yield and more efficient use of subsequent crop processing equipment.

It is to be understood that the regulation of plants in accordance with the instant invention does not include the total inhibition or the killing of such plants. Although phytotoxic amounts of the materials disclosed herein might be employed to exert a herbicidal (killing) action, it is contemplated here to employ only plant regulating amounts of such materials in order to modify the normal sequential development of the treated plant to agricultural maturity. As may be expected, and as apparent to those skilled in the art, such plant regulating amounts will vary, not only with the material selected, but also with the modifying effect desired, the specie of plant and its stage of development, the plant growth medium and whether a permanent or transitory effect is sought.

In accordance with this invention it has been found that desired modification of plants is achieved by applying to above-described plant regulants to seeds, emerging seedlings, roots, stems, leaves, flowers, fruits or other plant parts. Such application may be made directly to the plant part, or indirectly by application to the plant growing medium.

The examples which follow are presented as illustrative, non-limiting demonstrations of the useful and unexpected plant regulant properties of the compounds of this invention.

EXAMPLE A

A number of corn plants of the Pioneer 3567 variety are grown from seeds in an aluminum pan for a period of one week. The height of each corn plant is then measured to the top of the whorl. A 1% solution of 2-(p-chlorophenyl)glyoxylonitrile, 2-oxime in acetone is prepared, and a 2.0 ml. portion of said solution is mixed with 0.8 ml. of acetone and 2.8 ml. of a water mixture with 0.05% of Aerosol OT. The resultant solution is then sprayed over the plants in the pan at an application rate equivalent to about 6.0 lbs./acre. A control pan, planted at the same time as the test pan, also has its plants measured, but receives no chemical application. The pans are transferred to a greenhouse and watered from below in a sand bench. Each pan is fertilized with 40 ml. of a 1.5% solution of Rapid-Gro about 2 days after treatment.

Two weeks after treatment the height of each plant in the pans is again measured to the top of the whorl. After determining the average height increase of the plants in the untreated control pan, it is found that at least two-thirds of the corn plants treated with the test compound of this invention show 26% or more stature reduction by direct comparison.

EXAMPLE B

A number of soybean plants of the Wayne variety are grown from seeds in an aluminum pan for a period of one week. The height of each soybean plant is then measured to the top of the terminal bud. A solution of 2-phenylgloxylonitrile, 2-oxime is prepared and applied to the soybean plants in the manner described in Example A. An untreated control pan is also prepared, and both pans are thereafter handled as described in said Example A.

Two weeks after treatment the height of each plant in the pans is again measured to the top of the terminal bud. After determining the average height increase of the plants in the untreated control pan, it is found that at least two-thirds of the soybean plants treated with the test compound of this invention show 26% or more stature reduction by direct comparison.

EXAMPLE C

The test described in Example B is repeated with other pans which are treated with 2-(p-chlorophenyl)glyoxylonitrile, 2-oxime and 2-(p-nitrophenyl)glyoxylonitrile, 2-oxime, respectively. The results obtained show that at least two-thirds of the soybean plants treated with each of the compounds of this invention exhibited 26% or more stature reduction versus the untreated controls.

EXAMPLE D

A number of wheat plants of the Waldron variety are grown from seeds in aluminum pans for a period of one week. The height of each wheat plant is then measured to the top of the whorl. Solutions of each of 2-(p-chlorophenyl)gloxylonitrile, 2-oxime and 2-phenylglyoxylonitrile, 2-oxime are prepared, and each is applied to a pan of wheat plants in the manner described in Example A. An untreated control pan is also prepared, and all pans are thereafter handled as described in said Example A.

Two weeks after treatment the height of each plant in the pans is again measured to the top of the whorl. After determining the average height increase of the plants in the untreated control pan, it is found that at least two-thirds of the wheat plants treated with each of the test compounds of this invention show 26% or more stature reduction by direct comparison.

In connection with the specific application rates recited in Examples A–D in terms of lbs./acre, it should be pointed out that these tests involve treatment of a relatively small number of plants in a 52 in.$^2$ pan. Thus, the actual rate of application of the chemical to the plants themselves is generally somewhat lower than the stated lbs./acre.

The growth inhibition or stature reduction demonstrated herein by the compounds of this invention is a valuable feature in plant regulation. Such reduction of stature can render a planted field more readily accessible to personnel or machinery which are needed for various pesticide applications, for cultivation during the growth cycle, and for ultimate harvesting. It has been found that reducing the stature of certain plants correspondingly reduces the incidence of pest infestation. At the same time, such plants may demonstrate increased resistance to drought and/or increased cold hardiness. Further, crop plants of reduced stature permit an increase in the plant population of a given growing area and will often lead to significant yield increases as illustrated by the following example.

EXAMPLE E

A field plot which had first been tilled, fertilized and treated with a mixture of commercial, pre-emergent herbicides is planted with corn of the Farmers Hybrid 4202 variety. Four weeks after planting, a portion of the corn plants in the field is treated with 2-(p-chlorophenyl)-gloxylonitrile, 2-oxime at a rate of about 1 lbs./acre. The chemical is applied in a solution containing equal parts by volume of acetone and water containing a small amount of Aerosol OT.

At maturity, the ears of corn from both treated and untreated plants are harvested, and a determination of dry weight is made. It is found that the corn plants treated with the test compound of this invention showed approximately 27% increase in yield by direct comparison with the control plants.

Plant growth regulant compositions of this invention, including concentrates which require dilution prior to application to the plants, contain at least one active ingredient and an adjuvant in liquid or solid form. The compositions are prepared by admixing the active ingredient with an adjuvant including diluents, extenders, carriers and conditioning agents to provide compositions in the form of finely-divided particulate solids, granules, pellets, solutions, dispersions or emulsions. Thus the active ingredient can be used with an adjuvant such as a finely-divided solid, a liquid of organic origin, water, a wetting agent, a dispersing agent, an emulsifying agent or any suitable combination of these.

The plant regulant compositions of this invention, particularly liquids and wettable powders, preferably contain as a conditioning agent one or more surface-active agents in amounts sufficient to render a given composition readily dispersible in water or in oil. The incorporation of a surface-active agent into the compositions greatly enhances their efficacy. By the term "surface-active agent" it is understood that wetting agents, dispersing agents, suspending agents and emulsifying agents are included therein. Anionic, cationic and non-ionic agents can be used with equal facility.

Preferred wetting agents are alkyl benzene and alkyl naphthalene sulfonates, sulfated fatty alcohols, amines or acid amides, long chain acid esters of sodium isethionate, esters of sodium sulfosuccinate, sulfated or sulfonated fatty acid esters, petroleum sulfonates, sulfonated vegetable oils, ditertiary acetylenic glycols, polyoxyethylene derivatives of alkylphenols (particularly isooctylphenol and nonylphenol) and polyoxyethylene derivatives of the mono-higher fatty acid esters of hexitol anhydrides (e.g. sorbitan). Preferred dispersants are methyl cellulose, polyvinyl alcohol, sodium lignin sulfonates, polymeric alkyl naphthalene sulfonates, sodium naphthalene sulfonate, polymethylene bisnaphthalenesulfonate and sodium N-methyl-N-(long chain acid) taurates.

Wettable powders are water-dispersible compositions containing one or more active ingredients, an inert solid extender and one or more wetting and dispersing agents. The inert solid extenders are usually of mineral origin such as the natural clays, diatomaceous earth and synthetic minerals derived from silica and the like. Examples of such extenders include kaolinites, attapulgite clay and synthetic magnesium silicate. The wettable powders compositions of this invention usually contain from about 5 to about 95 parts by weight of active ingredient, from about 0.25 to 25 parts by weight of wetting agent, from about 0.25 to 25 parts by weight of dispersant and from 4.5 to about 94.5 parts by weight of inert solid extender, all parts being by weight of the total composition. Where required, from about 0.1 to 2.0 parts by weight of the solid inert extender can be replaced by a corrosion inhibitor or antifoaming agent or both.

Aqueous suspensions can be prepared by mixing together and grinding an aqueous slurry of water-insoluble active ingredient in the presence of dispersing agents to obtain a concentrated slurry of very finely-divided particles. The resulting concentrated aqueous suspension is characterized by its extremely small particle size, so that when diluted and sprayed, coverage is very uniform.

Emulsifiable oils are usually solutions of active ingredient in water-immiscible or partially water-immiscible solvents together with a surface active agent. Suitable solvents for the active ingredient of this invention include hydrocarbons and water-immiscible ethers, esters or ketones. The emulsifiable oil compositions generally contain from about 5 to 95 parts active ingredient, about 1 to 50 parts surface-active agent and about 4 to 94 parts solvent, all parts being by weight based on the total weight of emulsifiable oil.

Granules are physically stable particulate compositions comprising active ingredient adhering to or distributed through a basic matrix of an inert, finely-divided particulate extender. In order to aid leaching of the active ingredient from the particulate, a surface-active agent such as those listed hereinbefore can be present in the composition. Natural clays, pyrophyllites, illite and vermiculite are examples of operable classes of particulate mineral extenders. The preferred extenders are the porous, absorptive, preformed particles such as preformed and screened particulate attapulgite or heat expanded, particulate vermiculite, and the finely-divided clays such as kaolin clays, hydrated attapulgite or bentonitic clays. These extenders are sprayed or blended with the active ingredient to form the plant growth regulant or phytotoxic granules.

The granular compositions of this invention generally contain from about 5 parts to about 30 parts by weight of active ingredient per 100 parts by weight of clay and 0 to about 5 parts by weight of surface active agent per 100 parts by weight of particulate clay. The preferred plant growth regulant or phytotoxicant granular compositions contain from about 10 parts to about 25 parts by weight of active ingredient per 100 parts by weight of clay.

When operating in accordance with the present invention, effective amounts of the regulants are applied to plant parts or to the plant growing medium in any convenient fashion. The application of liquid and particulate solid plant regulant compositions to above ground portions of plants can be carried out by conventional methods, e.g. power dusters, boom and hand sprayers and spray dusters. The compositions can also be applied from airplanes as a dust or a spray because of their effectiveness at low dosages. The application of plant regulant compositions to the plant growing medium is usually carried out by incorporating the compositions in the soil or other media in the area where modifications of the plants is desired.

The application of an effective plant regulant amount of the compounds of this invention to the plant is essential and critical for the practice thereof. The exact amount of active ingredient to be employed is dependent upon the response desired in the plant as well as such other factors such as the plant species and stage of development thereof, and the amount of rainfall as well as the specific active applied. In foliar treatment for the modification of vegetative growth, the active ingredients are applied in amounts from about 0.01 to about 10 or more pounds per acre. In applications for increasing the maturation rate of plants including increasing the sugar content of plants, e.g. sugar cane, and facilitating the defoliation of plants, e.g. cotton and soybeans, the active ingredients are applied in amounts of at least 0.1 pound per acre. In applications for stimulating the growth of plants to obtain improved yield of plant products, the active ingredients are applied in amounts of 0.02 to 5.0 pounds per acre. Thus, the effective amount for each response can best be stated in terms of that response, e.g. a plant regulant amount for general modification, a tillering amount for tillering, an amount sufficient to increase the maturation rate for responses such as defoliation, increased sugar content and the like, and a desiccating amount for desiccation. It is believed that one skilled in the art can readily determine from the teachings of this specification, including examples, the appropriate application rate for particular purposes.

While the invention has been described herein with regard to certain specific embodiments, it is not so limited. It is to be understood that variations and modifications thereof may be made by those skilled in the art without departing from the spirit and scope of this invention.

What is claimed is:

1. A method of reducing the stature of plants which comprises treating said plants with a stature reducing amount of a compound of the formula

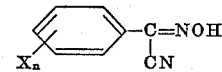

wherein $n$ is zero or one, and X is chlorine, bromine or $NO_2$.

2. A method as defined in claim 1 wherein said plants are treated at a rate of from about 0.01 to about 10.0 lbs./acre.

3. A method as defined in claim 1 wherein $n$ is zero.

4. A method as defined in claim 1 wherein $n$ is one.

5. A method as defined in claim 4 wherein X is chlorine.

6. A method as defined in claim 4 wherein X is $NO_2$.

7. A method as defined in claim 1 wherein the plants are corn, wheat or soybean plants.

8. A method as defined in claim 1 wherein the plants are corn plants.

9. A method as defined in claim 5 wherein the plants are corn plants.

10. A method for increasing the yield of corn, wheat or soybean plants which comprises treating said plants, at a rate of from about 0.01 to about 10.0 lbs./acre, with a compound of the formula

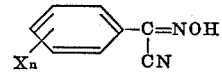

wherein $n$ is zero or one, and X is chlorine, bromine or $NO_2$.

11. A method as defined in claim 10 wherein the plants are corn plants.

12. A method as defined in claim 10 wherein the plants are soybean plants.

13. A method as defined in claim 10 wherein the plants are wheat plants.

14. A method as defined in claim 10 wherein $n$ is zero.

15. A method as defined in claim 10 wherein $n$ is one.

References Cited

UNITED STATES PATENTS

| | | | |
|---|---|---|---|
| 3,234,255 | 2/1966 | Hackmann et al. | 71—105 |
| 3,495,968 | 2/1970 | Kaufman | 71—105 |

LEWIS GOTTS, Primary Examiner

C. L. Mills, Assistant Examiner

U.S. Cl. X.R.

71—105